United States Patent
Pang et al.

(10) Patent No.: US 9,278,794 B2
(45) Date of Patent: Mar. 8, 2016

(54) SMALL FOOD STORAGE CONTAINER

(71) Applicants: Wonseo Pang, Daejeon (KR); Seongtaek Pang, Daejeon (KR); Jaehui Pang, Daejeon (KR)

(72) Inventors: Wonseo Pang, Daejeon (KR); Seongtaek Pang, Daejeon (KR); Jaehui Pang, Daejeon (KR)

( * ) Notice: Subject to any disclaimer, the term of this patent is extended or adjusted under 35 U.S.C. 154(b) by 0 days.

(21) Appl. No.: 14/399,075

(22) PCT Filed: May 16, 2013

(86) PCT No.: PCT/KR2013/004326
§ 371 (c)(1),
(2) Date: Nov. 5, 2014

(87) PCT Pub. No.: WO2013/183868
PCT Pub. Date: Dec. 12, 2013

(65) Prior Publication Data
US 2015/0136783 A1    May 21, 2015

(30) Foreign Application Priority Data
Jun. 5, 2012   (KR) .................. 10-2012-0060178

(51) Int. Cl.
| | |
|---|---|
| *B65D 81/34* | (2006.01) |
| *A47J 47/01* | (2006.01) |
| *B65D 81/20* | (2006.01) |
| *A23L 3/015* | (2006.01) |

(52) U.S. Cl.
CPC ............. *B65D 81/34* (2013.01); *A47J 47/01* (2013.01); *A23L 3/015* (2013.01); *B65D 81/2069* (2013.01)

(58) Field of Classification Search
CPC .... B65D 81/34; B65D 81/32; B65D 81/2084; B65D 81/2076; B65D 81/2069; B65D 81/2007; A47J 47/01; A23L 3/3418; A23L 3/0155; A23L 3/3409; A23L 3/015
USPC .................. 220/500, 501, 4.27, 4.26, 203.28, 220/203.01; 206/538; 53/474, 473, 471, 53/467; 426/404
See application file for complete search history.

(56) References Cited

U.S. PATENT DOCUMENTS

| | | | | |
|---|---|---|---|---|
| 6,035,769 | A  * | 3/2000 | Nomura ................ | A47J 36/027 219/730 |
| 2003/0070563 | A1 * | 4/2003 | Wang .................... | A23L 3/0155 99/472 |
| 2007/0175896 | A1 * | 8/2007 | Bursztein ........... | B65D 43/0218 220/231 |

FOREIGN PATENT DOCUMENTS

| | | |
|---|---|---|
| JP | 2007-261658 A | 10/2007 |
| KR | 20-1999-0012238 U | 4/1999 |

(Continued)

OTHER PUBLICATIONS

International Search Report dated Aug. 19, 2013, issued in corresponding application No. PCT/KR2013/004326.

*Primary Examiner* — Robert J Hicks
(74) *Attorney, Agent, or Firm* — Westerman, Hattori, Daniels & Adrian, LLP (57) ABSTRACT

The present invention relates to a small food storage container including: a food storing body having a shape of a container having a food storing space in which food is stored; a food filling body detachably mounted on the food storing body and having one or more air inlets formed along the periphery thereof to allow the inside to communicate with the outside and a food filling space formed at the inside thereof to communicate with the food storing space to fill the food thereinto; and a food opening/closing part fitted to the inside of the food filling body and having a shape of dishes facing each other to define the food storing space and the food filling space to open and close the food filling space by suctioning and discharging pressures of air.

8 Claims, 5 Drawing Sheets

(56) References Cited

FOREIGN PATENT DOCUMENTS

| KR | 10-2003-0015181 A | 2/2003 |
| KR | 10-2005-0112192 A | 11/2005 |
| KR | 10-2009-0109166 A | 10/2009 |
| TW | 29605382 U1 * | 5/1996 | ......... B65D 81/2007 |

* cited by examiner

SMALL FOOD STORAGE CONTAINER

BACKGROUND OF THE INVENTION

1. Field of the Invention

The present invention relates to a small food storage container, and more particularly, to a small food storage container that is configured to open and close external air introduced into a food storing space through the application of an external pressure to a food storing body and the release of the applied external pressure from the food storing body and to open and close the movement of food from the food storing space to a food filling space in a gentle manner.

2. Background of the Related Art

A small food storage container is generally used to store gelled food such as ketchup, hot pepper paste, mayonnaise and the like therein and to squeeze it whenever needed.

Generally, such gelled food is sold in a market in the state of being stored in small or large-sized food storage container, and when they are purchased by users, they are used as they are stored in the small or large-sized food storage container or they are moved and stored in his or her separate small food storage containers.

By the way, if an external pressure is applied to the conventional small food storage container to squeeze the food stored in a food storing space, external air is not introduced gently into the food storing space to prevent the food from being discharged well. Accordingly, many studies on the small food storage container capable of gently discharging food therefrom have been made.

For example, there is provided Korean Utility Model Registration No. 20-0438541 issued to the same applicant as the invention, which discloses a small food storage container including: a body having a food storing space contracted in shape if an external pressure is applied thereto and returned to its original shape if the applied external pressure is removed, a food outlet, and an air inlet formed on the top portion of the food storing space to introduce external air into the food storing space and having such a size capable of injecting food thereinto; an air inlet stopper made of a synthetic resin in such a manner as to be separably coupled to the air inlet and having an air hole punched thereon to allow the external air to be introduced into the air inlet of the body after introduced into the interior thereof and an air hole opening/closing part adapted to close the air hole by means of the discharge pressure generated from the food storing space and to be separated from the air hole by means of the suction pressure generated from the food storing space to allow the air to be introduced into the air hole; an outlet stopper mounted on the food outlet of the body to prevent the food outlet from being contaminated and to control the discharging of the food.

However, the above-mentioned conventional small food storage container achieves smooth discharging, but when the food is discharged, a large quantity of food may be momentarily discharged from the food storing space. That is, a quantity of food discharged cannot be accurately controlled, and further, a portion around the food outlet may be always dirty.

SUMMARY OF THE INVENTION

Accordingly, the present invention has been made in view of the above-mentioned problems occurring in the prior art, and it is an object of the present invention to provide a small food storage container that is provided with a food opening/closing part adapted to open and close external air introduced into a food storing space through the application of an external pressure to a food storing body and the release of the applied external pressure from the food storing body and to open and close the movement of food from the food storing space to a food filling space in a gentle manner.

It is another object of the present invention to provide a small food storage container that has filling scales indicated on the outer peripheral surface of a food filling body to control a quantity of food filled into a food filling space in an accurate manner.

It is yet another object of the present invention to provide a small food storage container that maintains food remaining in a food filling space in a clean state after the food has been discharged, while the food is being stored in a food storing space.

It is still another object of the present invention to provide a small food storage container that forms first to third delay spaces to prevent the food stored in a food storing space from being momentarily discharged in a large quantity to a food filling space.

To accomplish the above-mentioned objects, according to the present invention, there is provided a small food storage container including: a food storing body having a shape of a container having a food storing space in which gelled food is stored, the food storing space being changed in shape by means of the application of an external pressure to the food storing body and being returned to the original shape thereof by means of the release of the applied external pressure therefrom; a food filling body detachably mounted on the food storing body and having a shape of a curved cylinder having open top and bottom portions, one or more air inlets formed along the periphery thereof in such a manner as to allow the inside to communicate with the outside, and a food filling space formed at the inside thereof in such a manner as to communicate with the food storing space to fill the food thereinto; and a food opening/closing part fitted to the inside of the food filling body and having a shape of dishes facing each other to define the food storing space and the food filling space to open and close the food filling space by means of suction and discharge pressures of air, so that if the food storing space is compressed by the external pressure applied to the food storing body, external air is closed by the discharge pressure generated from the food storing space, while the food stored in the food storing space is being moved to the food filling space, and if the food storing space is returned to the original shape thereof, the external air is introduced into the food storing space by the suction pressure generated from the food storing space, while the food filling space is being closed.

According to the present invention, desirably, the food filling body has a polygonal stopper extended upward and downward by a given length from the inner peripheral surface thereof in such a manner as to become narrow in width toward both ends thereof.

According to the present invention, desirably, the food filling body has a cap mounted on the top end periphery thereof to seal the food filling space.

According to the present invention, desirably, the food filling body has filling scales indicated on the outer peripheral surface thereof to allow a quantity of food filled in the food filling space to be checked.

According to the present invention, desirably, the food opening/closing part includes: a handle; an upper opening/closing member fitted to the lower end periphery of the handle in such a manner as to become increased in thickness toward the center portion thereof and serving to open and close the food filling space by means of the suction and discharge pressures of air; a body having a shape of a cylinder located at the underside of the upper opening/closing member in such a manner as to become reduced in diameter toward the upper portion thereof and one or more food outlets formed along the periphery thereof; a conveying tube having a shape of a drinking straw in such a manner as to be fitted to the inside of the body and one or more through holes formed on the corresponding portions to the food outlets in such a manner as to communicate with the food outlets; and a lower opening/closing member having a shape of a disc extended outward from the outer peripheral surface of the body in such a manner as to become decreased in thickness toward the outer periphery thereof and a fixing protrusion extended upward from the top surface thereof in such a manner as to correspond to the stopper, the lower opening/closing member serving to open and close the food filling space by means of the suction and discharge pressures of air.

According to the present invention, desirably, the upper opening/closing member has a first sealing portion extended downward from the underside thereof in such a manner as to be reduced inward in width, and the first sealing portion is adapted to increase the sealing ability with the stopper and to form a first delay space adapted to prevent a large quantity of food from being discharged momentarily.

According to the present invention, desirably, the upper opening/closing member has a protrusion extended from the underside surface thereof in such a manner as to be brought into contact with the inner peripheral surface of the food filling body to form second and third delay spaces adapted to prevent a large quantity of food from being discharged momentarily.

According to the present invention, desirably, the food outlets of the upper opening/closing member and the air inlets of the food filling body are brought into contact with each other, when both of the suction and discharge pressures are not generated from the food storing space, to allow the air introduced into the food storing space through the air inlets and the food discharged to the food filling space through the food outlets to be closed.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 5A to 5C are sectional views showing the use states of the small food storage container according to the present invention, wherein

DETAILED DESCRIPTION OF THE PREFERRED EMBODIMENTS

Hereinafter, an explanation on a small food storage container according to the present invention will be in detail given with reference to the attached drawing.

Figure 1:
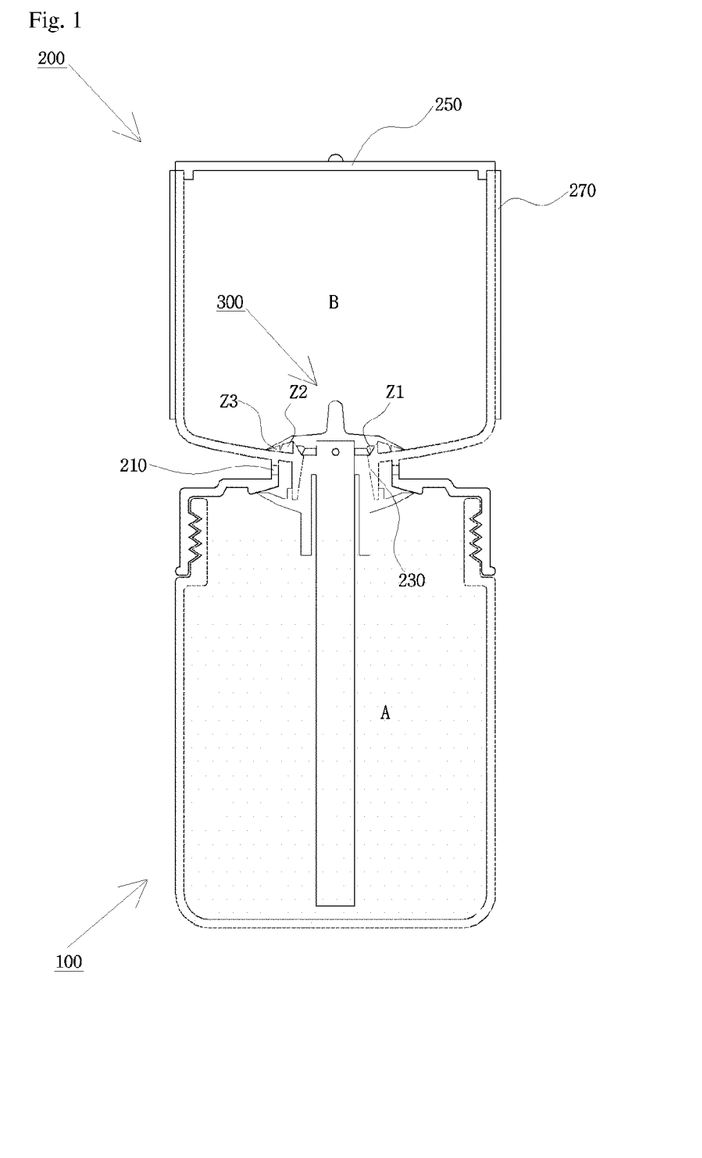
FIG. 1 is a sectional view showing a small food storage container according to the present invention.
Figure 2:
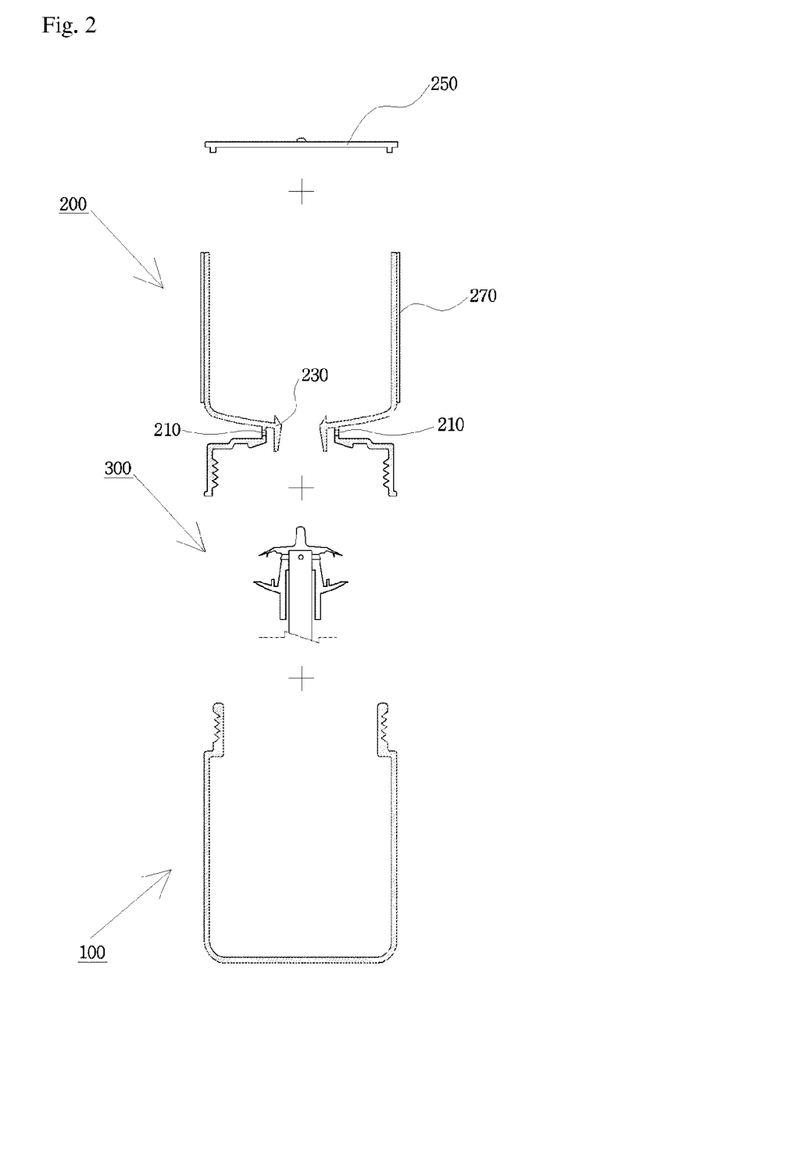
FIG. 2 is an exploded view showing the small food storage container according to the present invention.
Figure 3:
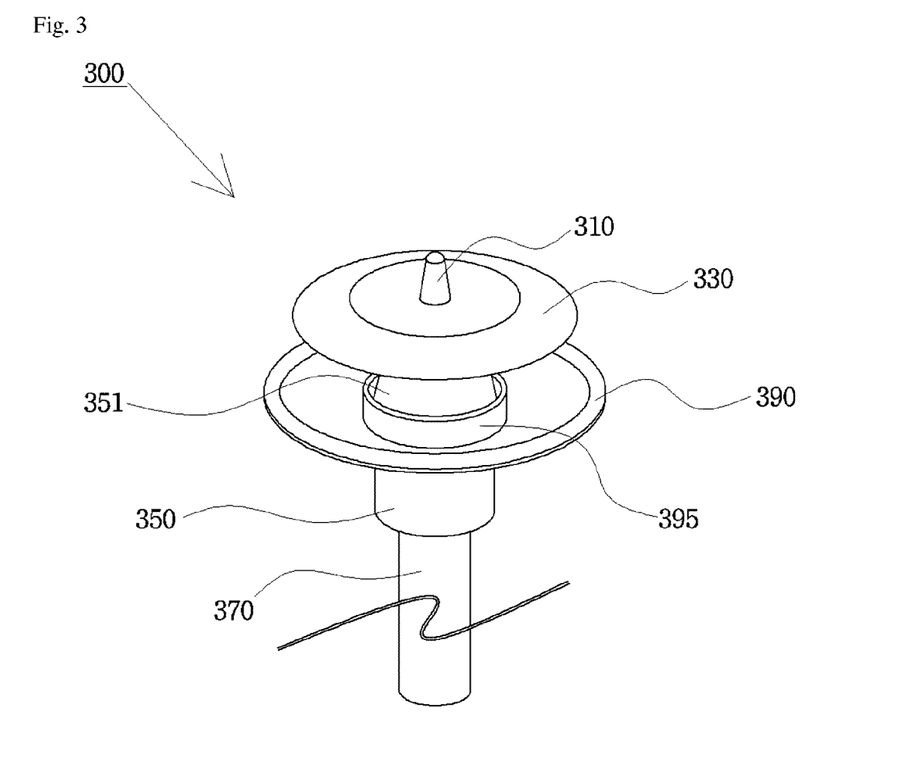
FIG. 3 is a perspective view showing the small food storage container according to the present invention.
Figure 4:
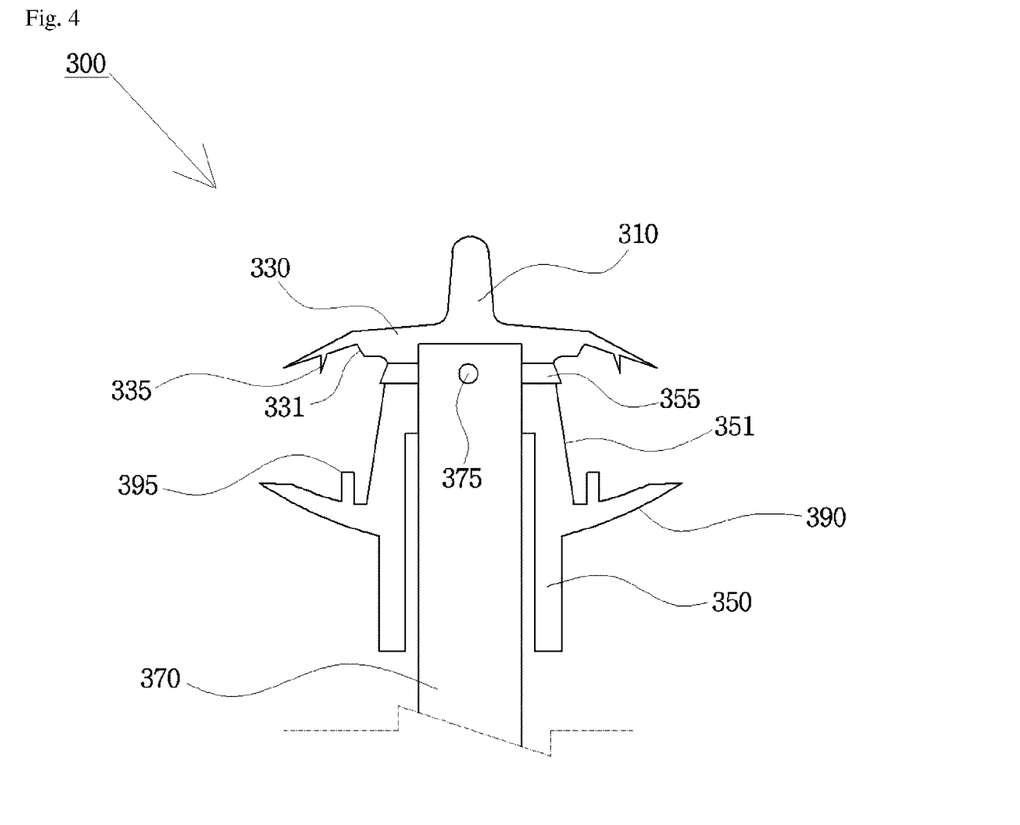
FIG. 4 is a detailed sectional view showing a food switch in the small food storage container according to the present invention.
Figure 5:
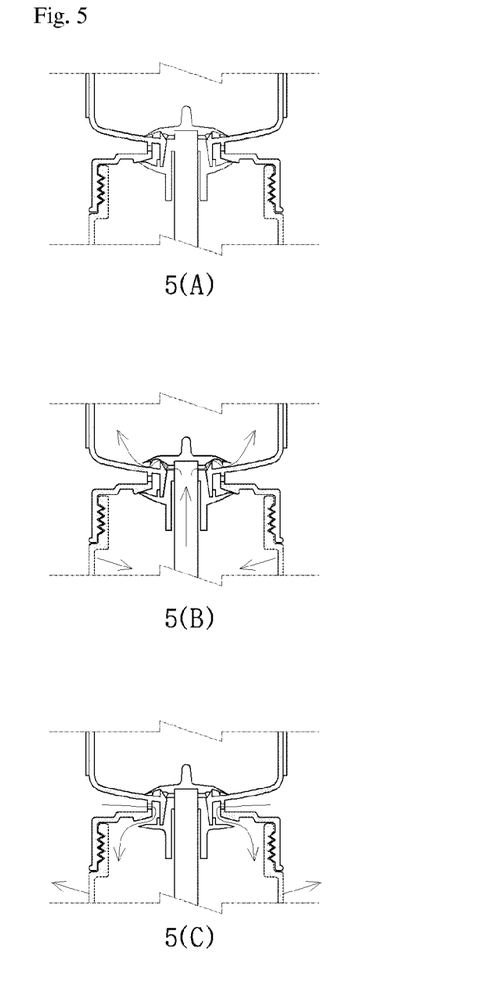
FIG. 5A shows a state in which no suction and discharge pressures are generated.
FIG. 5B shows a state in which a discharge pressure is generated.
FIG. 5C shows a state in which a suction pressure is generated.

FIG. 1 is a sectional view showing a small food storage container according to the present invention, FIG. 2 is an exploded view showing the small food storage container according to the present invention, FIG. 3 is a perspective view showing the small food storage container according to the present invention, FIG. 4 is a detailed sectional view showing a food switch in the small food storage container according to the present invention, and FIGS. 5A to 5C are sectional views showing the use states of the small food storage container according to the present invention, wherein FIG. 5A shows a state in which no suction and discharge pressures are generated, FIG. 5B shows a state in which a discharge pressure is generated, and FIG. 5C shows a state in which a suction pressure is generated.

As shown in FIGS. 1 to 5C, a small food storage container according to the present invention includes a food storing body 100, a food filling body 200, and a food opening/closing part 300.

The food storing body 100 has a shape of a container having a food storing space A formed at the inside thereof, in which gelled food is stored.

At this time, the food storing body 100 is made of a generally elastic synthetic resin capable of being changed in shape when an external pressure is applied thereto and returned to its original shape when the applied external pressure is released.

Further, the food storing body 100 is desirably transparent or semi-transparent to allow a quantity of food stored in the food storing space A to be visually checked by a user.

The food filling body 200 is detachably mounted on the food storing body 100 and has a shape of a curved cylinder having open top and bottom portions.

The food filling body 200 has screw lines formed along the inner peripheral surface of the lower portion thereof, and the food storing body 100 has screw lines formed along the outer peripheral surface of the upper portion thereof in such a manner as to correspond to the screw lines formed on the food filling body 200, so that the food filling body 200 is detachably mounted on the food storing body 100 if necessary.

At this time, the food filling body 200 has one or more air inlets 210 formed along the periphery thereof in such a manner as to allow the inside to communicate with the outside and a food filling space B formed at the inside thereof in such a manner as to communicate with the food storing space A to fill the food thereinto.

On the other hand, the food filling body 200 has a polygonal stopper 230 extended upward and downward by a given length from the inner peripheral surface thereof in such a manner as to become narrow in width toward both ends thereof, thus being easily fitted to the food opening/closing part 300 as will be discussed later.

Further, the food filling body 200 has a cap 250 mounted on the top end periphery thereof to seal the food filling space B, thus desirably preventing foreign matters like dust from entering the food filled therein.

Furthermore, the food filling body 200 has filling scales 270 indicated on the outer peripheral surface thereof to allow a quantity of food filled in the food filling space B to be checked.

Accordingly, the food filling body 200 is desirably transparent or semi-transparent to allow a quantity of food filled in the food filling space B to be visually checked by the user.

The food opening/closing part 300 is made of an elastic synthetic resin and fitted to the inside of the food filling body 200, while having a shape of dishes facing each other.

On the other hand, the food opening/closing part 300 is provided under the principle of an air check valve, and in view of the manufacturing cost, as shown in FIGS. 3 and 4, it is very desirable that the food opening/closing part 300 is configured wherein thin films move by suction and discharge pressures to open and close an air flowing passage.

Accordingly, the food opening/closing part 300, which is fitted to the inside of the food filling body 200, divides one space formed by the food storing body 100 and the food filling body 200 coupled to each other into the food storing space A and the food filling space B to open and close the food filling space B by means of suction and discharge pressures of air.

That is, if the food storing space A is contracted by the external pressure applied to the food storing body 100, the introduction of external air is closed by the discharge pressure generated from the food storing space A, while the food stored in the food storing space A is being moved to the food filling space B, and contrarily, if the food storing space A is returned to its original shape, external air is introduced into the food storing space A by the suction pressure generated from the food storing space A, while the food filling space B is being closed.

When both of the suction and discharge pressures are not generated from the food storing space A, the air inlets 210 and food outlets 355 as will be discussed later are brought into contact with each other to allow the air introduced into the food storing space A through the air inlets 210 and the food discharged to the food filling space B through the food outlets 355 to be closed.

FIG. 5A shows a state in which no suction and discharge pressures are generated, and in this case, the food opening/closing part 300 is brought into contact with the inner peripheral surface of the food filling body 200 to allow the food storing space A and the food filling space B to be all closed to generate no air flow therefrom.

FIG. 5B shows a state in which a discharge pressure is generated, and in this case, an external pressure is applied to the food storing body 100 to generate a discharge pressure therefrom, so that the air introduced into the food storing space A through the air inlets 210 is closed and the food filling space B is open to allow the internal air and food in the food storing space A to be moved to the food filling space B.

FIG. 5C shows a state in which a suction pressure is generated, and in this case, the external pressure applied to the food storing body 100 is released to generate a suction pressure therefrom, so that the internal air and food in the food storing space A are closed and the food filling space B is open to allow the external air to be introduced into the food storing space A through the air inlets 210.

The food opening/closing part 300 includes a handle 310, an upper opening/closing member 330, a body 350, a conveying tube 370, and a lower opening/closing member 390.

The handle 310 has a shape of a cylinder whose width is reduced toward the top portion thereof to allow the food opening/closing part 300 be easily grasped, thus being easily fitted to the stopper 230 disposed inside the food filling body 200 and stably supporting the upper opening/closing member 330 thereagainst.

The upper opening/closing member 330 has a shape of a disc fitted to the lower end periphery of the handle 310 in such a manner as to become increased in thickness toward the center portion thereof from the outer periphery thereof, and the upper opening/closing member 330 serves to open and close the food filling space B by means of the suction and discharge pressures of air.

The upper opening/closing member 330 has a first sealing portion 331 extended downward from the underside thereof in such a manner as to be reduced inward in width, and the first sealing portion 331 is adapted to increase the sealing ability with the stopper 230 and to form a first delay space Z1 adapted to prevent a large quantity of food from being discharged momentarily.

Further, the upper opening/closing member 330 has a protrusion 335 extended from the underside peripheral surface thereof in such a manner as to be brought into contact with the inner peripheral surface of the food filling body 200 to form second and third delay spaces Z2 and Z3 adapted to prevent a large quantity of food from being discharged momentarily.

The body 350 has a shape of a cylinder located at the underside of the upper opening/closing member 330, while having a second sealing portion 351 formed on the upper peripheral surface thereof in such a manner as to become reduced in diameter, and the second sealing portion 351 is adapted to increase the sealing ability with the stopper 230.

At this time, the body 350 has one or more food outlets 355 formed along the periphery thereof.

As shown in FIG. 5B, when the external pressure is applied to the food storing body 100, the food outlets 355 are adapted to discharge the stored food to the food filling space B through the conveying tube 370.

The conveying tube 370 has a shape of a drinking straw and is fitted to the inside of the body 350.

At this time, the conveying tube 370 has one or more through holes 375 formed on the corresponding portions to the food outlets 355 in such a manner as to communicate with the food outlets 355.

On the other hand, if the body 350 is formed spaced apart from the bottom surface of the food storing body 100 by a given distance, there is no need to form the conveying tube 370, but the drinking straw as the conveying tube 370 is desirably used in view of the manufacturing cost.

The lower opening/closing member 390 has a shape of a disc and is extended outward from the outer peripheral surface of the body 350 in such a manner as to become decreased in thickness toward the outer periphery thereof.

That is, the lower opening/closing member 390 serves to open and close the air introduced through the air inlets 210 by means of the suction and discharge pressures of air.

At this time, the lower opening/closing member 390 has a fixing protrusion 395 extended upward from the top surface thereof in such a manner as to correspond to the stopper 230 and to be stably fitted to the stopper 230.

Now, an explanation on a method for using the small food storage container according to the present invention will be given. The gelled food is first filled into the food storing space A in the food storing body 100, and the food opening/closing part 300 is inserted from bottom to top into the stopper 230 disposed inside the food filling body 200 in such a manner as to allow the handle 310 of the food opening/closing part 300 to be disposed upward. Next, the screw lines formed on the inner peripheral surface of the lower portion of the food filling body 200 insertedly coupled to the food opening/closing part 300 are coupled to those formed on the outer peripheral surface of the upper portion of the food storing body 100, and after that, if an external pressure is applied to the food storing body 100 to compress the food storing body 100 or if the applied external pressure is released from the food storing body 100 to allow the food storing body 100 to be returned to its original shape, the food stored in the food storing space A moves to the food filling space B by a desired quantity, and after moving, the food is discharged to the outside when used.

As mentioned above, the small food storage container according to the present invention is configured to open and close the external air introduced into the food storing space through the application of the external pressure to the food storing body and through the release of the applied external pressure from the food storing body and to open and close the movement of food from the food storing space to the food filling space in a gentle manner.

Further, the small food storage container according to the present invention controls the quantity of food filled into the food filling space in an accurate manner.

Furthermore, the small food storage container according to the present invention maintains the food remaining in the food filling space in a clean state after the food has been discharged, while the food is being stored in the food storing space.

Additionally, the small food storage container according to the present invention prevents the food stored in the food storing space from being momentarily discharged in a large quantity to the food filling space.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A small food storage container comprising:
   a food storing body having a shape of a container having a food storing space in which gelled food is stored, the food storing space being changed in shape by means of an application of an external pressure to the food storing body and being returned to the original shape thereof by means of the release of the applied external pressure therefrom;
   a food filling body detachably mounted on the food storing body and having a shape of a curved cylinder having open top and bottom portions, one or more air inlets formed along a periphery thereof in such a manner as to allow the inside of the food filling body to communicate with the outside of the food filling body, and a food filling space formed at the inside thereof in such a manner as to communicate with the food storing space to fill the food thereinto; and
   a food opening/closing part fitted to the inside of the food filling body and having a shape of dishes facing each other to define the food storing space and the food filling space to open and close the food filling space by means of suction and discharge pressures of air, so that if the food storing space is compressed by the external pressure applied to the food storing body, external air is closed by the discharge pressure generated from the food storing space, while the food stored in the food storing space is being moved to the food filling space, and if the food storing space is returned to the original shape thereof, the external air is introduced into the food storing space by the suction pressure generated from the food storing space, while the food filling space is being closed.

2. The small food storage container according to claim 1, wherein the food filling body has a polygonal stopper extended upward and downward by a given length from the inner peripheral surface of the food filling body in such a manner as to become narrow in width toward both ends thereof.

3. The small food storage container according to claim 2, wherein the food filling body has a cap mounted on a top end periphery thereof to seal the food filling space.

4. The small food storage container according to claim 1, wherein the food filling body has filling scales indicated on an outer peripheral surface thereof to allow a quantity of food filled in the food filling space to be checked.

5. The small food storage container according to claim 1, wherein the food opening/closing part comprises:
   a handle;
   an upper opening/closing member fitted to a lower end periphery of the handle in such a manner as to become increased in thickness toward a center portion thereof and serving to open and close the food filling space by means of the suction and discharge pressures of air;
   a body having a shape of a cylinder located at the underside of the upper opening/closing member in such a manner as to become reduced in diameter toward an upper portion thereof and one or more food outlets formed along the periphery thereof;
   a conveying tube having a shape of a drinking straw in such a manner as to be fitted to the inside of the body and one or more through holes formed on the corresponding portions to the food outlets in such a manner as to communicate with the food outlets; and
   a lower opening/closing member having a shape of a disc extended outward from the outer peripheral surface of the body in such a manner as to become decreased in thickness toward the outer periphery thereof and a fixing protrusion extended upward from the top surface thereof in such a manner as to correspond to a stopper, the lower opening/closing member serving to open and close the food filling space by means of the suction and discharge pressures of air.

6. The small food storage container according to claim 5, wherein the upper opening/closing member has a first sealing portion extended downward from the underside thereof in such a manner as to be reduced inward in width, and the first sealing portion is adapted to increase the sealing ability with the stopper and to form a first delay space adapted to prevent a large quantity of food from being discharged momentarily.

7. The small food storage container according to claim 6, wherein the upper opening/closing member has a protrusion extended from the underside surface thereof in such a manner as to be brought into contact with the inner peripheral surface of the food filling body to form second and third delay spaces and adapted to prevent a large quantity of food from being discharged momentarily.

8. The small food storage container according to claim 5, wherein the food outlets of the upper opening/closing member and the air inlets of the food filling body are brought into contact with each other, when both of the suction and discharge pressures are not generated from the food storing space, to allow the air introduced into the food storing space through the air inlets and the food discharged to the food filling space through the food outlets to be closed.

* * * * *